US006092814A

United States Patent [19]
Kageler

[11] Patent Number: 6,092,814
[45] Date of Patent: Jul. 25, 2000

[54] TOOL HOLDER FOR INSERTED TOOLS IN DRILLING AND/OR HAMMERING MACHINES

[75] Inventor: Sven Kageler, Leinfelden-Echterdingen, Germany

[73] Assignee: Robert Bosch GmbH, Stuttgart, Germany

[21] Appl. No.: 09/117,108

[22] PCT Filed: Feb. 3, 1997

[86] PCT No.: PCT/DE97/00203

§ 371 Date: Jul. 22, 1998

§ 102(e) Date: Jul. 22, 1998

[87] PCT Pub. No.: WO97/28930

PCT Pub. Date: Aug. 14, 1997

[30] Foreign Application Priority Data

Feb. 7, 1996 [DE] Germany .......................... 196 04 282

[51] Int. Cl.[7] ............................ B23B 45/16; B23B 31/22

[52] U.S. Cl. ............................ 279/19.4; 279/14; 279/22; 279/24; 279/71; 279/75; 279/905

[58] Field of Search ................................ 279/19.3–19.5, 279/22, 24, 71, 14, 74, 75, 904, 905

[56] References Cited

U.S. PATENT DOCUMENTS

| | | | |
|---|---|---|---|
| 4,691,929 | 9/1987 | Neumaier et al. | 279/19.3 |
| 5,326,199 | 7/1994 | Kleine et al. | 279/19.4 |
| 5,505,570 | 4/1996 | Meyen et al. | 279/19.4 |
| 5,558,478 | 9/1996 | Odendahl et al. | 408/226 |

FOREIGN PATENT DOCUMENTS

| | | | |
|---|---|---|---|
| 0 293 327 B1 | 7/1991 | European Pat. Off. . | |
| 33 10 147 A1 | 9/1984 | Germany . | |
| 3419465 | 11/1985 | Germany | 279/19.4 |
| 41 04 131 A1 | 11/1991 | Germany . | |
| 745510 | 4/1987 | Japan | 279/19.3 |

*Primary Examiner*—Steven C. Bishop
*Attorney, Agent, or Firm*—Michael J. Striker

[57] ABSTRACT

A tool holder (10) is proposed for tools inserted into machines for drilling and/or percussion operation having means for rotational driving and axial locking of a tool shank which can be inserted into a tool receptacle (11) of the respective machine, wherein a plurality of axial strips (13) which project inward radially are provided for rotational driving and at least one radially lockable locking body is provided at the tool holder (10) for locking. In order to accommodate tool shanks of two grooved shank systems with different outer diameters, two axial strips (13) which are located opposite from one another and are directed inward radially are arranged at the receptacle bore (12). The axial strips (13) are guided such that they can be released outward radially, particularly in a springing manner, wherein the axial strips (13) engage in corresponding grooves (20) of the respective inserted tool shank (19) for rotational driving.

11 Claims, 9 Drawing Sheets

TOOL HOLDER FOR INSERTED TOOLS IN DRILLING AND/OR HAMMERING MACHINES

BACKGROUND OF THE INVENTION

The invention is based on a tool holder for tools inserted into machines for drilling and/or percussion operation.

In tool holders of the kind mentioned above, it is already known from DE 41 04 131 A1 for the purpose of receiving different tool shanks to use combination tool holders with two functionally distinct tool receptacles for tools having a round shank and tools having a grooved shank. Both tool receptacles are formed in a common or shared tool holder which is complicated to produce with respect to manufacturing technique and which has means for rotational driving of inserted tools with a round shank or grooved shank. It is further known from DE 33 10 147 A1 to receive tools with a round shank and with a grooved shank having different diameters in a tool holder, wherein radially adjustable clamping jaws are arranged in the tool receptacle of the tool holder which either clamp the round shank between the clamping jaws or engage in corresponding axial grooves in the grooved shank for rotational driving. In this case, a disadvantage consists in that the clamping jaws must first be opened whenever a tool is changed and must be clamped again manually after changing the tool. Further, adequate axial guidance of the tool by the clamping jaws is impossible in the case of tools with a grooved shank.

Finally, EP 0 293 327 A1 discloses a combination tool holder for tools with a round shank and tools with a grooved shank which have different rotational driving with the same shank diameter of the tools. However, this tool holder cannot be used for tools having a different outer diameter of the shank.

SUMMARY OF THE INVENTION

In the present solution, the objective is to further develop a tool holder for tools inserted in machines for drilling and/or percussion operation in such a way that the tool receptacle can receive tools with a grooved shank of smaller diameter as known from the SDS-plus system as well as tools with a grooved shank having a larger outer diameter, e.g., for medium-duty use (SDS-midi system).

In the tool holder in accordance with the present invention the axial strips which are located opposite from one another and project inwards are guided radially in the tool receptacle, so that they can be released outwards in a springing matter, to enable optional insertion of a tool shank with longitudinal grooves which are located opposite one another and which have a smaller outer diameter, and a tool shank has the same core diameter but also has outwardly projecting longitudinal ridges with a greater outer diameter, wherein for the purpose of rotational driving the axial strips cooperate with the corresponding longitudinal grooves and the axial grooves cooperate with the corresponding longitudinal ridges of respective inserted grooved shank.

The tool holder, according to the invention, has the advantage that insertion tools with two different grooved shank systems with different outer diameters can be inserted into the tool receptacle and locked axially without having to open and close the clamping jaws manually. Both grooved shank systems can also differ from one another in length, wherein in the tool holder for both grooved shank systems the axial guidance is carried out at the continuous axial receptacle bore of identical diameter. In the shank system with the larger outer diameter, additional axial guidance is achieved by the longitudinal grooves in the receptacle bore of the tool receptacle, wherein the base of these longitudinal grooves has a diameter corresponding to the outer diameter of the longitudinal webs or ridges of the tool shank engaging therein.

The axial locking of the tool shanks is carried out in a known manner automatically by locking bodies, especially by a ball which deflects in a radially springing manner when the tool shank is inserted and subsequently springs back into a locking recess at the tool shank and is thus locked automatically. In order to remove the insertion tool, the lock is released manually.

Further advantageous developments and improvements of the features given in the main claim are indicated by the features mentioned in the subclaims. In a particularly advantageous manner, for the guidance of tool shanks with different outer diameters, the continuous axial receptacle bore of the tool holder has, at its circumference, a plurality of axial grooves which terminate at a front widened portion for the purpose of rotational driving of insertion tools whose shank has a larger outer diameter, wherein the axial strips which serve for rotational driving of insertion tools whose shank has a smaller outer diameter and which project inward and can be released or locked by springing outward are arranged in the region of the above-mentioned axial grooves.

DESCRIPTION OF THE PREFERRED EMBODIMENT

Figure 1A:
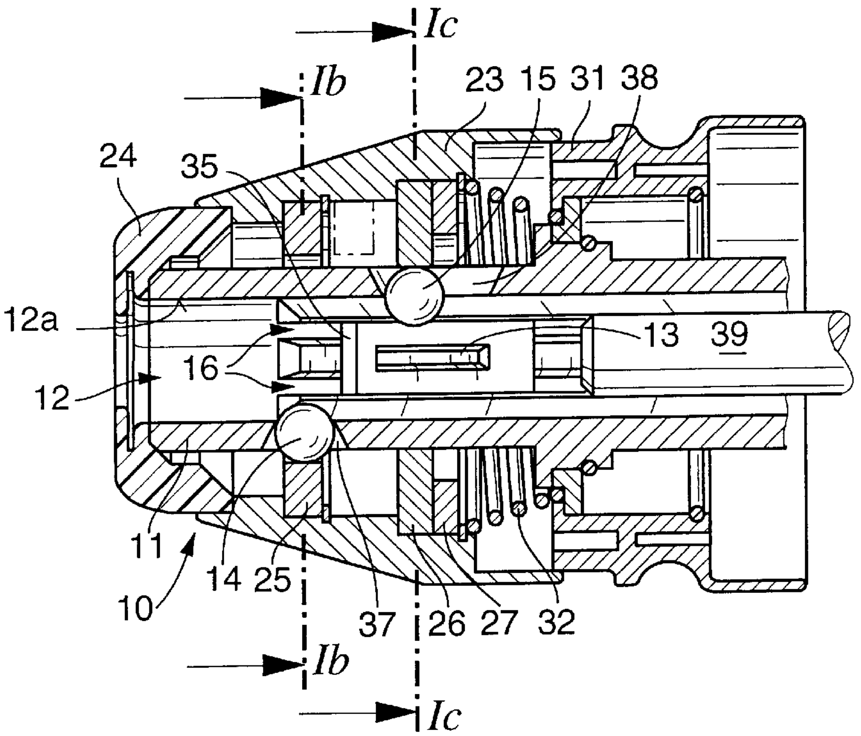
FIG. 1*a* is an axially extending sectional view of a tool holder according to a first embodiment of the present invention.

In the first embodiment example according to FIGS. 1*a*–1*c* and 2*a*–2*c*, the tool holder of an electric handheld machine tool for drilling and/or percussion operation for insertion tools such as rock drills and chisels is designated by 10. The tool holder 10 has a tool receptacle spindle 11 with a continuous axial receptacle bore 12. As will be explained more fully with reference to FIGS. 3*a* to 6*c*, tool shanks of insertion tools which can have two different outer diameters are inserted into the receptacle bore 12. Means for rotational driving and for axial locking are provided in the receptacle bore 12, wherein a plurality of axial strips 13 which project inward are provided for rotational driving, and two locking bodies 14, 15 in the form of balls which can be locked with respect to their radial movement are provided for axial locking. The tool receptacle bore has the profile of the larger grooved shank system (SDS-midi) in that six axial grooves 16 are arranged at the circumference of the receptacle bore 12 which terminate in a front widened portion 12*a* of the receptacle bore 12. According to FIGS. 5*a*–5*c* and 6*a*–6*c*, longitudinal ridges 17 of an insertion tool with a grooved shank 18 engage in these axial grooves 16, these longitudinal ridges 17 having an outer diameter of about 14 mm. The core diameter of the tool shank 18 between the longitudinal ridges 17, at approximately 10 mm, corresponds to the diameter of the receptacle bore 12, which, at the same time, corresponds to the shank diameter of the grooved shank 19 of the smaller grooved shank system (SDS-plus) shown in FIGS. 3*a*–3*c* and 4*a*–4*c*. In a known manner, the grooved shank 19 of the smaller grooved shank system has two longitudinal grooves 20 which are located opposite from one another and, at a 90-degree offset thereto, two locking recesses 21 for the locking body 15 which are located opposite from one another. On the other hand, the grooved shank 18 of the system having a larger outer diameter has an axial recess 22 for the locking body 14 for axial locking at each of the two longitudinal ridges 17 which are located opposite from one another.

Figure 1B:
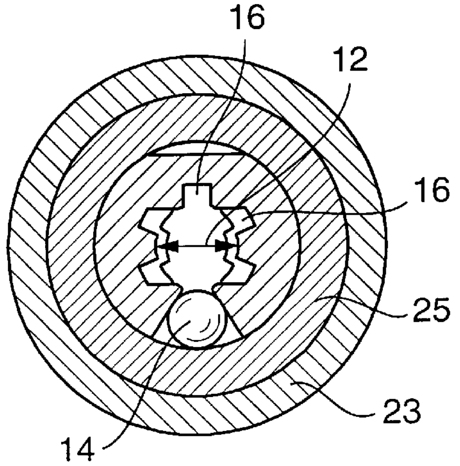
FIG. 1*b* is a cross-sectional view of the tool holder shown in FIG. 1*a* taken along the line Ib—Ib.
Figure 1C:
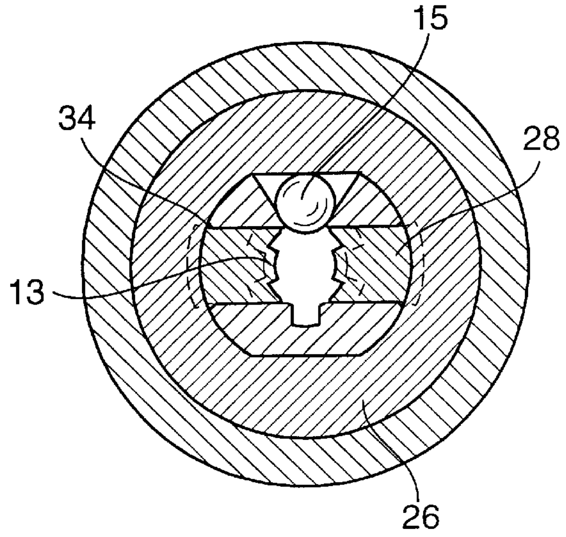
FIG. 1*c* is a cross-sectional view of the tool holder shown in FIG. 1*a* taken along the line Ic—Ic.
Figure 2A:
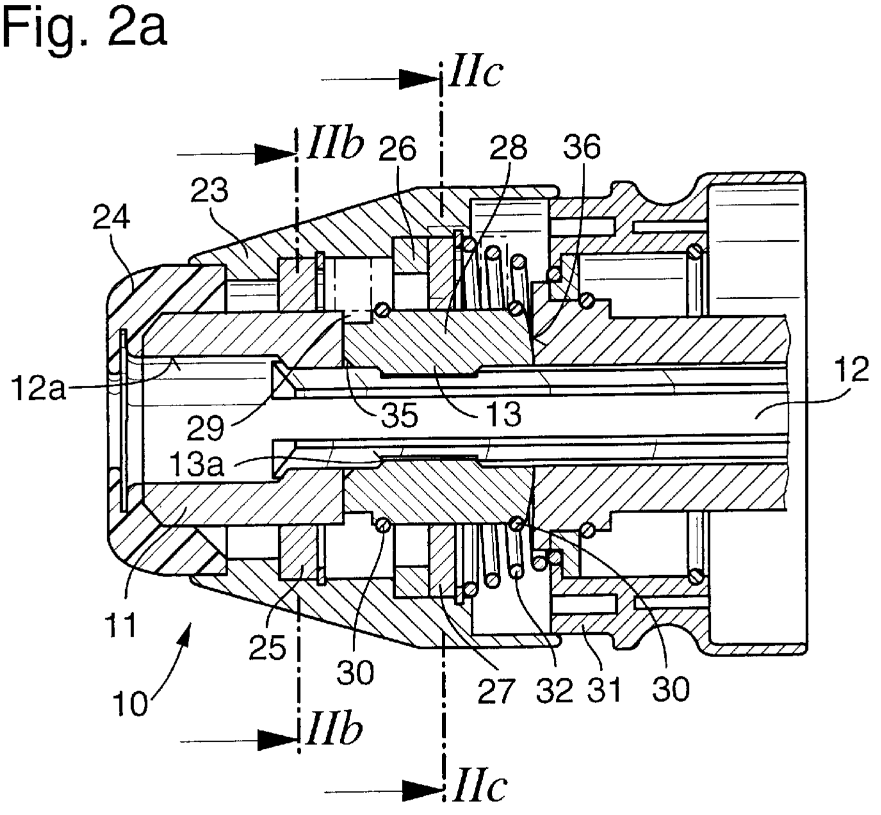
FIG. 2*a* is an axially extending sectional view of a tool holder according to the first embodiment of the present invention as shown in FIG. 1*a*, rotated by 90°.
Figure 2B:
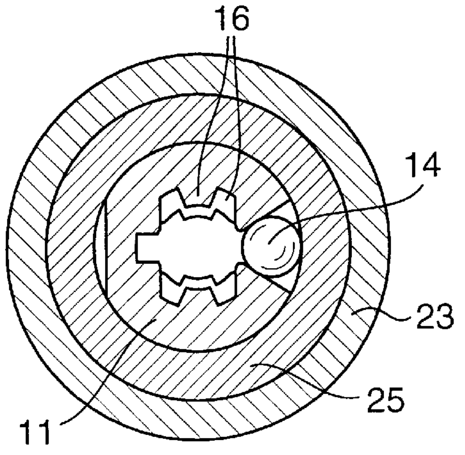
FIG. 2*b* is a cross-sectional view of the tool holder shown in FIG. 2*a* taken along the line IIb—IIb.
Figure 2C:
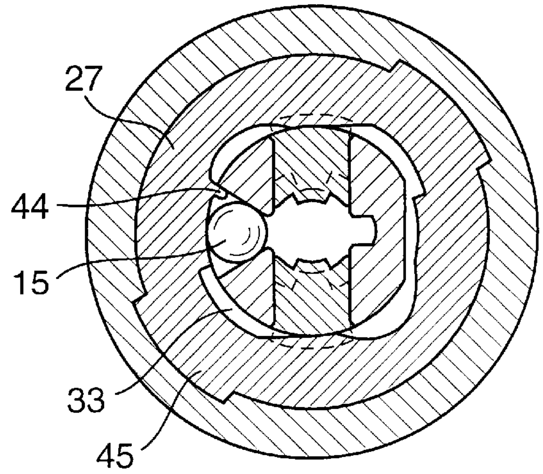
FIG. 2*c* is a cross-sectional view of the tool holder shown in FIG. 2*a* taken along the line IIc—IIc.
Figure 3A:
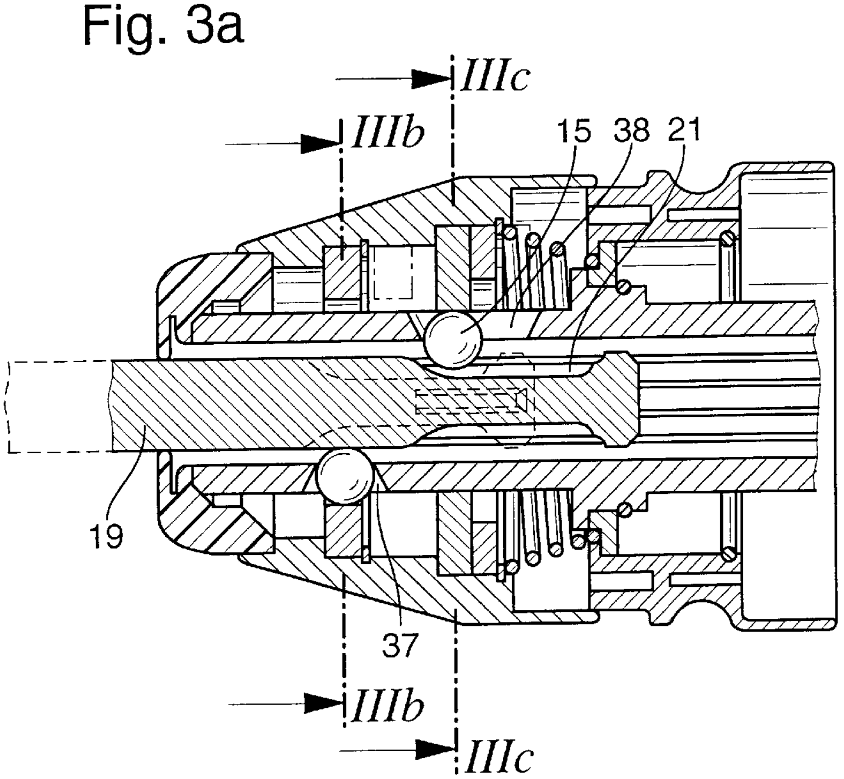
FIG. 3*a* is an axially extending sectional view of a tool holder according to the first embodiment of the present invention as shown in FIG. 1*a*, with an inserted tool shank having a smaller diameter (SDS-plus)
Figure 3B:
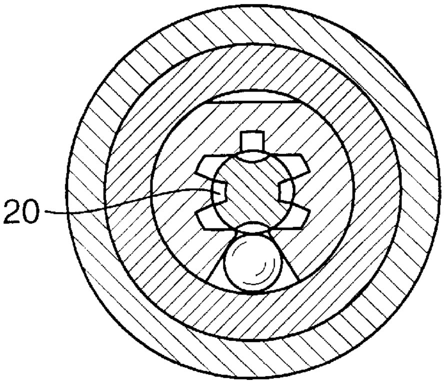
FIG. 3*b* is a cross-sectional view of the tool holder shown in FIG. 3*a* taken along the line IIIb—IIIb.
Figure 3C:
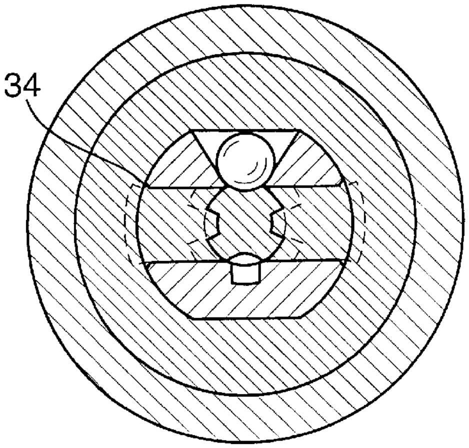
FIG. 3*c* is a cross-sectional view of the tool holder shown in FIG. 3*a* taken along the line IIIc—IIIc.
Figure 4A:
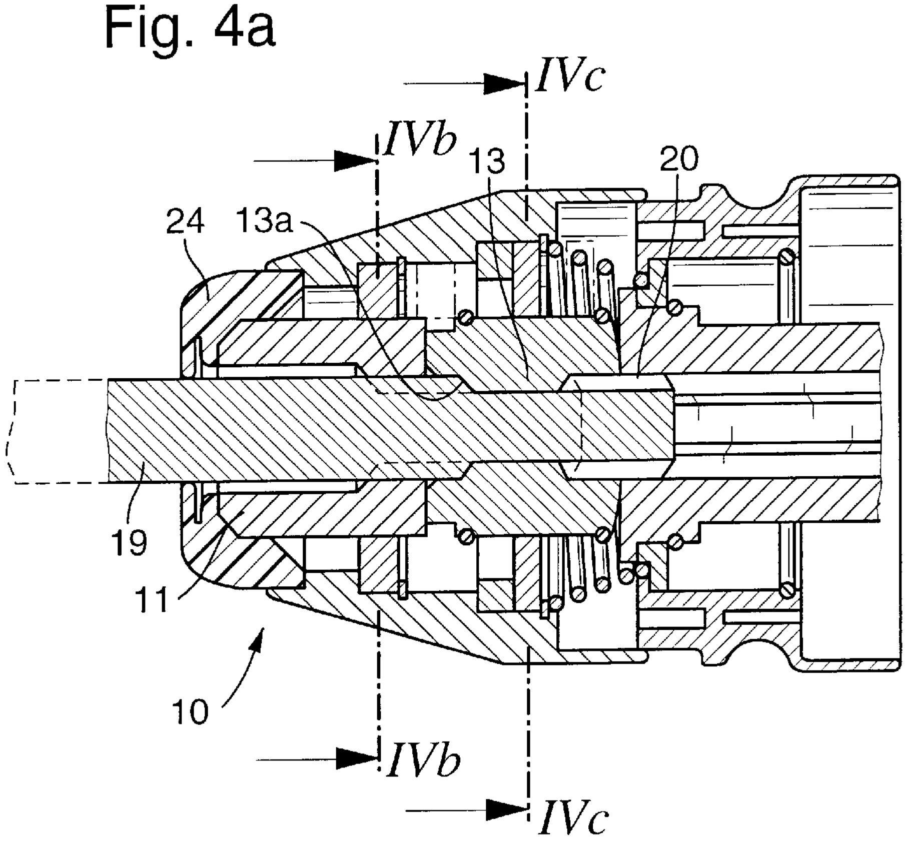
FIG. 4*a* is an axially extending sectional view of a tool holder according to the first embodiment of the present invention as shown in FIG. 3*a*, with an inserted tool shank having a smaller diameter (SDS-plus), and rotated by 90°.
Figure 4B:
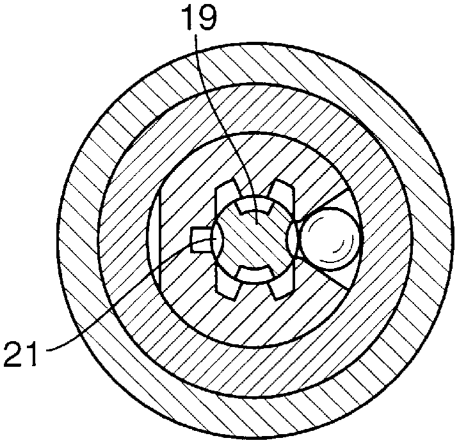
FIG. 4*b* is a cross-sectional view of the tool holder shown in FIG. 4*a* taken along the line IVb—IVb.
Figure 4C:
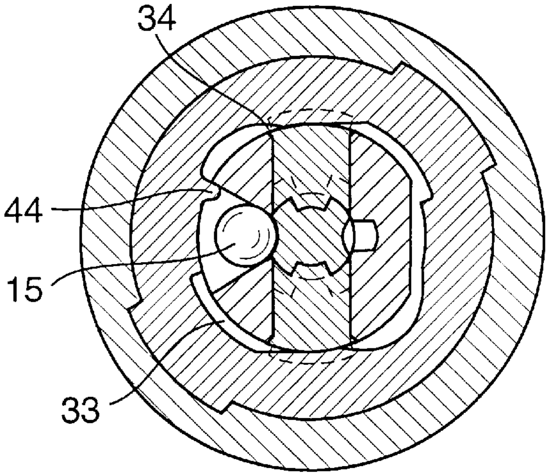
FIG. 4*c* is a cross-sectional view of the tool holder shown in FIG. 4*a* taken along the line IVc—IVc.
Figure 5A:
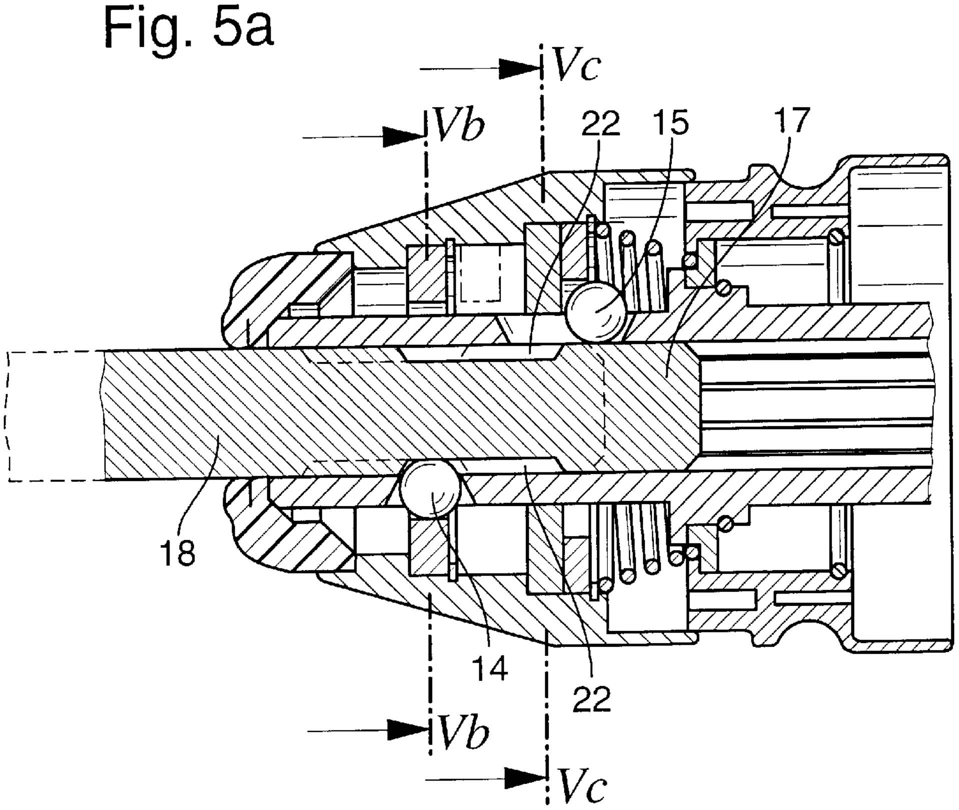
FIG. 5*a* is an axially extending sectional view of a tool holder according to the first embodiment of the present invention as shown in FIG. 1*a*, with an inserted tool shank having a larger diameter (SDS-midi)
Figure 5B:
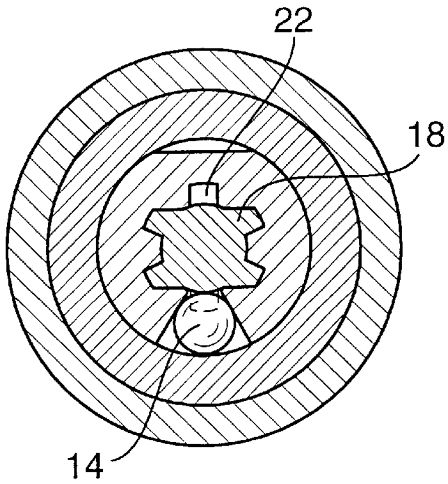
FIG. 5*b* is a cross-sectional view of the tool holder shown in FIG. 5*a* taken along the line Vb—Vb.
Figure 5C:
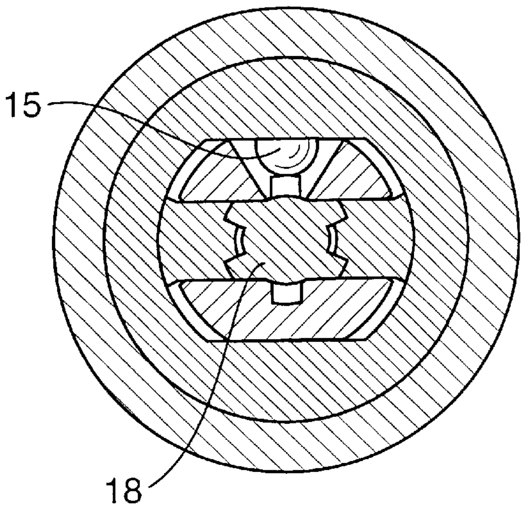
FIG. 5*c* is a cross-sectional view of the tool holder shown in FIG. 5*a* taken along the line Vc—Vc.
Figure 6A:
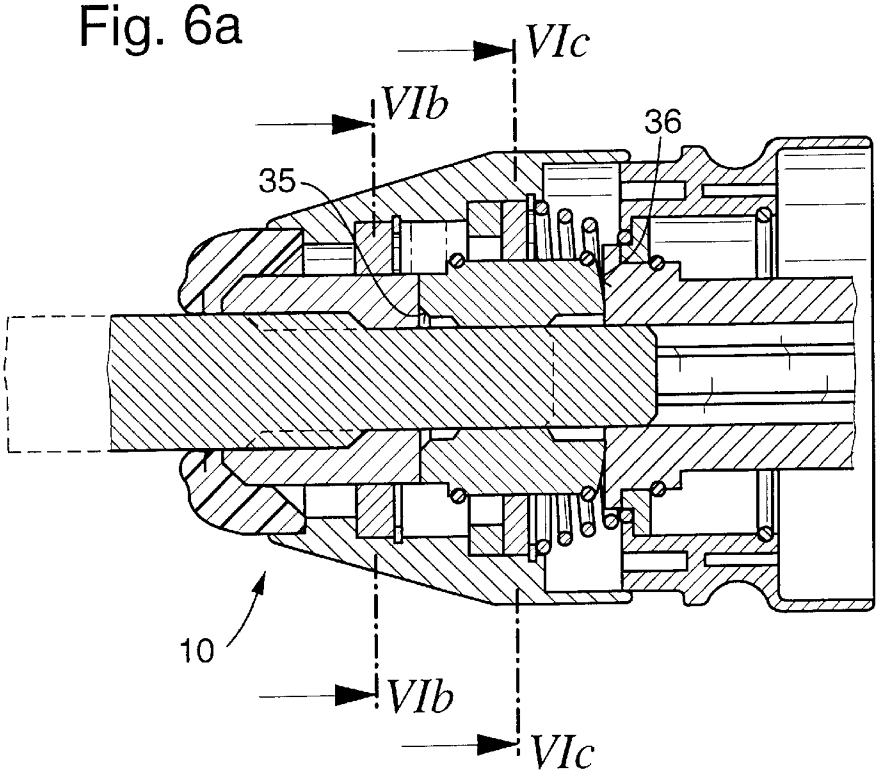
FIG. 6*a* is an axially extending sectional view of a tool holder according to the first embodiment of the present invention as shown in FIG. 5*a*, with an inserted tool shank having a larger diameter (SDS-midi), and rotated by 90°.
Figure 6B:
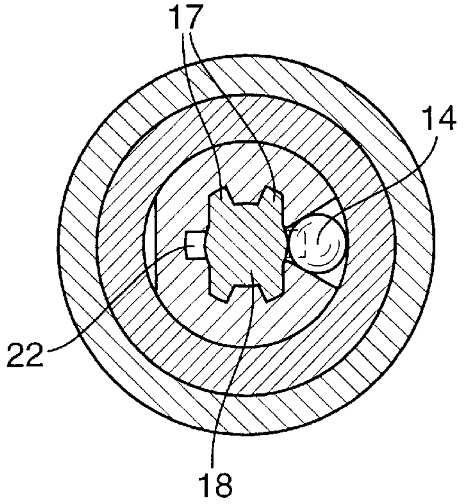
FIG. 6*b* is a cross-sectional view of the tool holder shown in FIG. 6*a* taken along the line Vib—VIb.
Figure 6C:
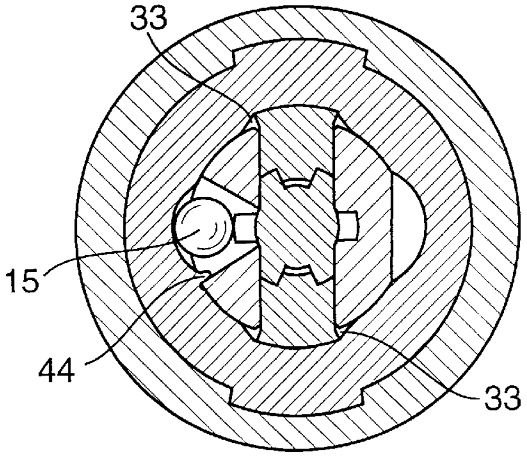
FIG. 6*c* is a cross-sectional view of the tool holder shown in FIG. 6*a* taken along the line VIc—VIc.
Figure 7A:
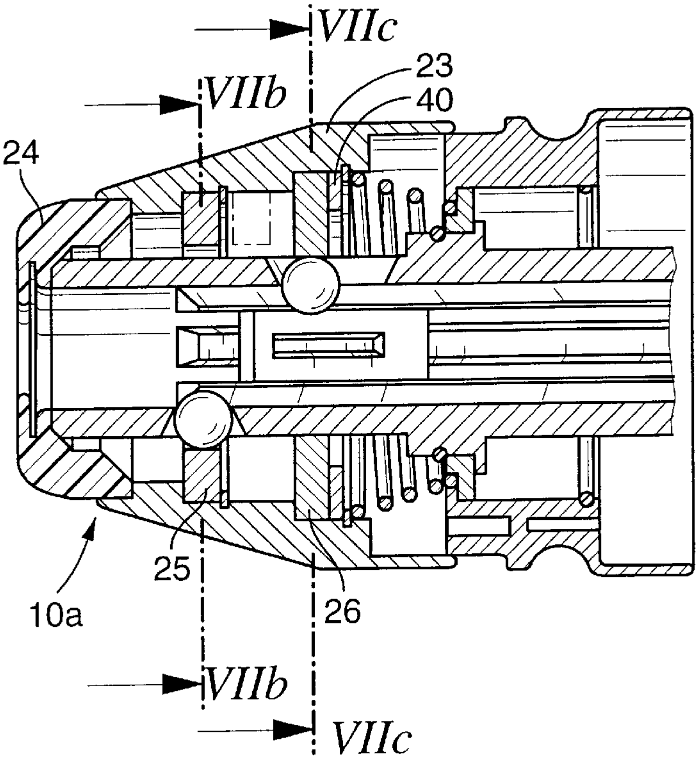
FIG. 7*a* is an axially extending sectional view of a tool holder according to a second embodiment of the present invention.
Figure 7B:
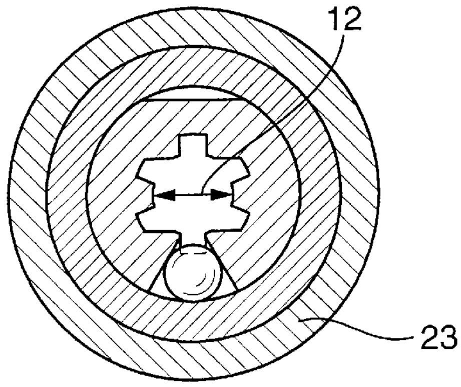
FIG. 7*b* is a cross-sectional of the tool holder shown in FIG. 7*a* taken along the line VIIc—VIIc.
Figure 7C:
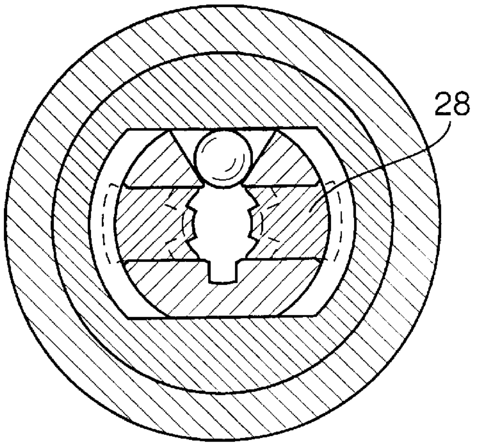
FIG. 7*c* is a cross-sectional view of the tool holder shown in FIG. 7*a* taken along the line VIIc—VIIc.
Figure 8A:
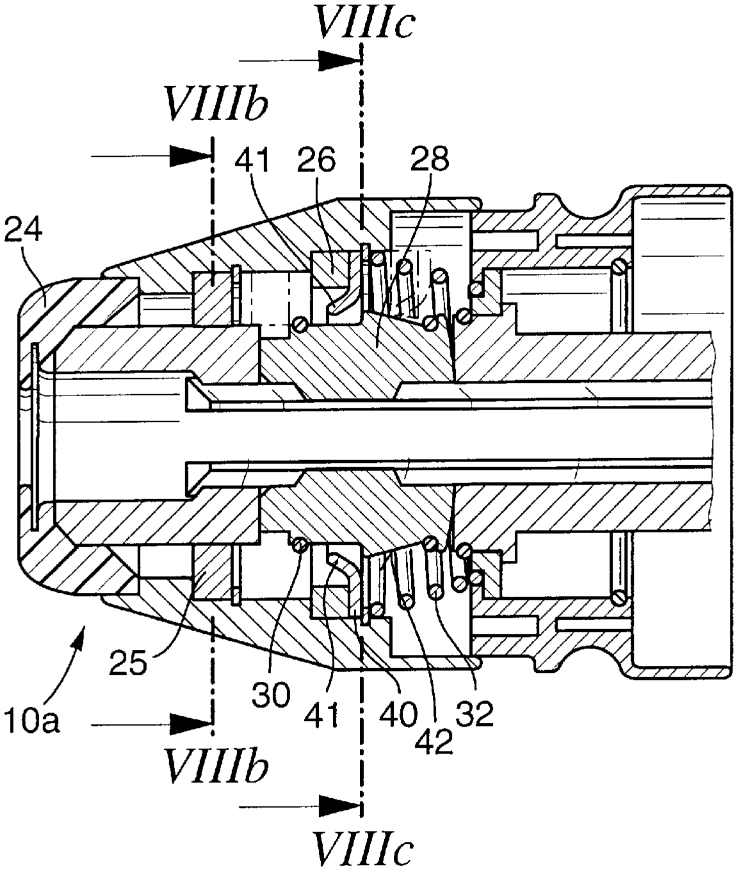
FIG. 8*a* is an axially extending sectional view of a tool holder according to the second embodiment of the present invention as shown in FIG. 7*a*, rotated by 90°.
Figure 8B:
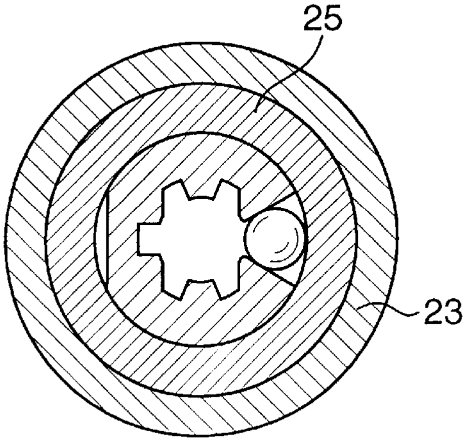
FIG. 8*b* is a cross-sectional view of the tool holder shown in FIG. 8*a* taken along the line VIIIb—VIIIb.
Figure 8C:
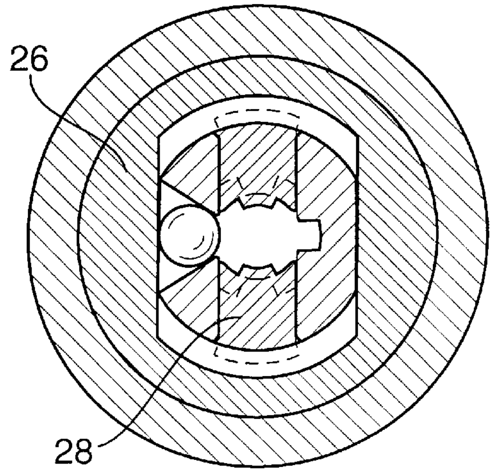
FIG. 8*c* is a cross-sectional view of the tool holder shown in FIG. 8*a* taken along the line VIIIc—VIIIc.

For the purpose of locking and unlocking the locking bodies 14 and 15, the receptacle spindle 11 of the tool holder 10 is enclosed by an actuating sleeve 23 which has, in the front, a sealing lip ring 24 which covers the receptacle bore 12 of the tool holder 10 in such a way that it still contacts the grooved shank 19 of the smaller grooved shank system. The actuating sleeve 23 has a locking ring 25 and 26, respectively, at the height of the locking bodies 14 and 15. The cross section of the locking ring 25 and 26 is shown in FIGS. 1*b* and 1*c*, respectively. Further, a control ring 27 is arranged in the actuating sleeve 23 behind the second locking ring 26. The control ring 27 radially locks two rotational driving jaws 28 which are located opposite from one another or releases the radial locking of the latter. The rotational driving jaws 28 are inserted in corresponding radial slots 29 of the receptacle spindle 11 and are held in their respective positions by two spring rings 30 which clamp around the latter and are constructed, e.g., as snap rings. A cover sleeve 31 is arranged behind the actuating sleeve 23 and fastened at the receptacle spindle 11. A pressure spring 32 which presses the actuating sleeve 23 into the rest position shown in the drawing is located between the actuating sleeve 23 and the cover sleeve 31. The actuating sleeve 23 can be displaced to the rear axially against the force of this pressure spring 32, wherein the two locking rings 25 and 26 release the locking bodies 14 and 15. Further, the actuating sleeve 23 can be rotated in the counterclockwise direction against a restoring spring, not shown in more detail, wherein the control ring 27—as can be seen from FIG. 6*c*—releases the rotational driving jaws 28 so that they can deflect outward into a recess 33 of the control ring 27 according to FIG. 3*c*. The axial strips 13 for the rotational driving of the insertion tools are formed at the inner side of the rotational driving jaws 28 integral therewith, so that these rotational driving jaws can be produced as individual parts from hardened steel, from ceramic or from some other low-wear, heavy-duty material. They can be exchanged when worn.

For the purpose of optional insertion of a tool shank with a smaller grooved shank system (SDS-plus) with a diameter of 10 mm and of a tool shank with a larger grooved shank system (SDS-midi), preferably with an outer diameter of 14 mm, the axial strips 13 which are located opposite from one another and are directed radially inward are guided into the slots 29 of the tool receptacle such that they can be released outward in a radially springing manner. For the purpose of rotational driving, the axial strips 13 cooperate with the corresponding longitudinal grooves 20 of an insertion tool with smaller grooved shank 19 and with the longitudinal ridges 17 of an insertion tool with a larger grooved shank 18. The receptacle bore 12 remains continuously identical in diameter until the front widened portion 12*a* in order to guide the tool shanks 18 and 19 having different outer diameters. When a tool with a smaller grooved shank is inserted according to FIGS. 3*a*–3*c* and 4*a*–4*c*, the inwardly projecting axial strips 13 at the two radially movable rotational driving jaws 28 located opposite from one another are held radially for the rotational driving of the insertion tool in that the rotational driving jaws 28 are held by spring pressure in a defined position radially inward against a stop 34 on both sides between the rotational driving jaws 28 and the receptacle spindle 11. The two rotational driving jaws 28 are pushed radially inward against their stop 34 by the spring rings 30 which are arranged at the outer circumference of the receptacle spindle 11 and rest on the two rotational driving jaws 28, wherein the stop 34 is formed by an outer widening at the rotational driving jaws 28. The inner surface of the rotational driving jaws 28 has the curvature of the receptacle bore 12. The axial strips 13 of the rotational driving jaws 28 have, in the front, an end face 13*a* which extends at a right angle to the axis of the tool holder 10 and whose edge can be somewhat rounded. This ensures that the rotational driving jaws 28 do not deflect outward radially when a grooved shank 19 with a smaller diameter is inserted. Further, each of the rotational driving jaws 28 has at its front end a bevel 35 which is directed inward conically. Moreover, each of the rotational driving jaws 28 has, at its rear end, a rounded portion 36 which extends outward. The purpose of both is that when a tool with a larger grooved shank 18 is inserted, its longitudinal ridges 17 initially strike against the bevel 35 of the rotational driving jaws 28 after insertion in the axial grooves 16 of the receptacle bore 12. As soon as the locking of the rotational driving jaws 28 is canceled by rotating the actuating sleeve 23, the rotational driving jaws 28 are swiveled outward radially over the rounded portion 36 by the longitudinal ridges 17 of the grooved shank 18 and move radially outward into the outer position according to FIGS. 5*a*–5*c* and 6*a*–6*c* when the grooved shank 18 is pushed in farther. The locking bodies 14 and 15 for the axial locking of the two different tool shanks 18 and 19 are at a distance from one another axially, wherein, in order to prevent excessive weakening of the receptacle spindle 11, they are so inserted in openings 37 and 38 of the receptacle spindle 11 which are located opposite from one another and offset axially relative to one another that the locking bodies 14 and 15 can be unlocked radially by an axial displacement of the actuating sleeve 23 and can deflect outward when a tool shank 18 or 19 is inserted. When the actuating sleeve 23 is released or let go of, it is pushed back again into the initial position by the pressure spring 32 and the locking bodies 14 and 15 are forced back again and fixed in their locking position by their respective locking ring 25 and 26. When a grooved shank 19 with smaller diameter is located in the tool holder 10, the rear locking body 15 engages in one of the two locking recesses 21 of the grooved shank 19. If a grooved shank 18 with larger outer diameter is located in the tool holder, the front locking body 14 engages in one of the axial recesses 22 at the longitudinal ridges 17 of the grooved shank 18. The rear locking body remains disengaged in that it remains behind the locking ring 26 (see FIG. 5*a*). In both cases, an axial displacement of the tool shank in the receptacle spindle 11 is ensured so that, on the one hand, a hammer or header 39, shown in FIG. 1*a*, which is guided in the receptacle bore 12 can exert the necessary blows on the end face of the insertion tool and, on the other hand, the tool is prevented from falling out or being hammered out of the tool holder by the locking bodies 14 and 15.

FIGS. 7*a*–7*c* and 8*a*–8*c* show a further embodiment example of a tool holder 10*a*, according to the invention, for receiving two grooved shank systems with different outer diameters, wherein only the locking of the two rotational driving jaws 28 has been modified in such a way that when the grooved shanks 18 and 19 with different diameters are inserted the actuating sleeve 23 need only be pushed back axially to cancel the axial locking of the two grooved shank systems and the radial locking of the rotational driving jaws 28. In order to achieve this, a sheet-metal ring 40 of spring steel is tensioned behind the locking ring 26 of the actuating sleeve 23, this sheet-metal ring 40 having, in the region of the rotational driving jaws 28, a spring tongue 41 which is directed inward diagonally. These spring tongues 41 limit the radial movement of the rotational driving jaws 28. However, this limiting is canceled by an axial displacement of the actuating sleeve 23 against the force of the pressure spring 32, so that the rotational driving jaws 28 can be moved radially outward against the force of the spring rings 30 when a grooved shank 18 with a larger outer diameter is inserted. When the actuating sleeve 23 is released again after the insertion of the tool shank, the pressure spring 32 presses the spring tongues 41 of the sheet-metal ring 40 into the position shown in dashed lines, over an inclination 42 at the rear of the rotational driving jaws 28, so that the latter can now be pushed again radially inward until reaching the locked position shown in FIG. 8*a* but on the other hand are held by the longitudinal ridges 17 of the shank 18 in the outer position limited by the spring tongues 41.

Figure 9:
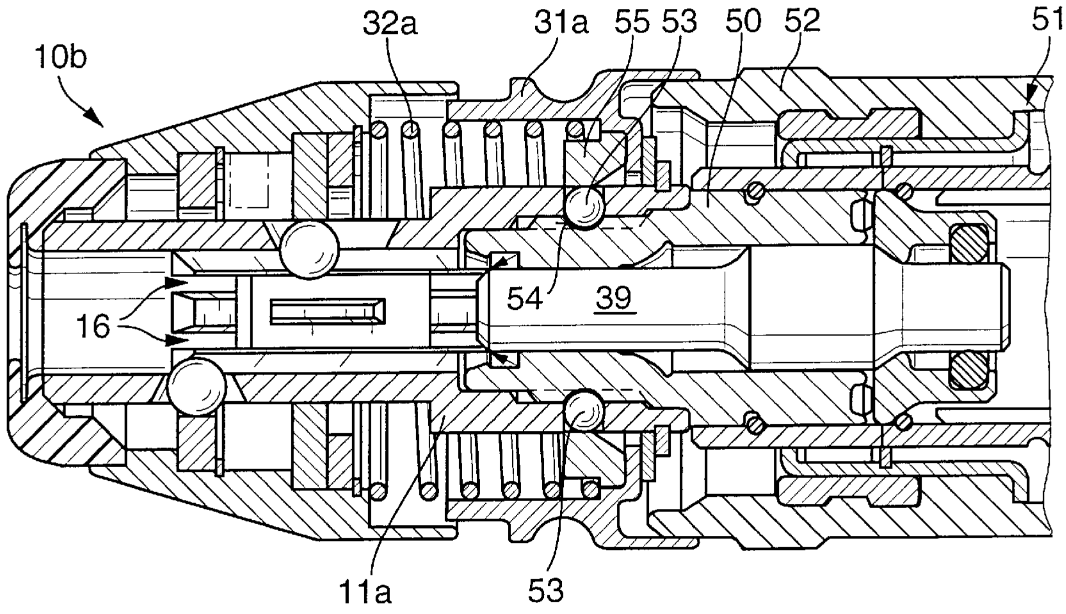
FIG. 9 shows a tool holder which is detachably fastened to the rotary spindle of a drill hammer, in accordance with a third embodiment of the present invention.

A further embodiment example of a tool holder, according to the invention, for insertion tools with two different shank diameters is shown in FIG. 9, wherein the tool holder 10*b* is removably fastened to the end of a drill spindle 50 of a drill hammer 51 at the spindle collar 52 of the machine. The cover sleeve 31*a* is pulled forward axially with a locking ring 55 against the pressure spring 32*a*, so that the radial locking of a plurality of locking balls 53 distributed along the circumference in corresponding openings of the receptacle spindle 11*a* is released. As is shown in dashed lines, the locking balls can deflect radially outward from an annular recess 54 located at the outer circumference of the drill spindle 50 and the tool holder 10*b* can be removed from the end of the drill spindle 50.

Further, in this embodiment example the hammer 39 is axially guided and sealed in the spindle bore of the drill spindle 50. The receptacle bore 12 of the receptacle spindle 11*a* with its axial grooves 16 is constructed so as to be correspondingly shorter in this case, since the guidance of the hammer 39 has been relocated in the drill spindle 50.

Insertion tools with two different grooved shank systems can be received by the tool holder according to the invention. The shank diameter of the smaller grooved shank system (SDS plus) represents the core diameter for the grooved shank system (SDS midi) with the larger outer diameter. The ridge height of the longitudinal ridges 17 of the larger insert system is predetermined by the larger diameter of this grooved shank or insert system. The core diameter of the larger insert system is the same as the outer diameter of the smaller insert system. It is possible for the smaller system to be used in the same tool receptacle due to the guidance of the receptacle bore 12 between its axial grooves 16 for the large insert system. The large profile is reduced to the small profile by the two radially movable rotational driving jaws 28. The rotational driving jaws 28 lie in a line with the guide regions of the receptacle bore 12 between the axial grooves 16 for the larger profile and interrupt the latter along a part of the length. They have axial strips 13 which engage in a longitudinal groove 20 of the smaller insert system. They further possess curved surfaces next to the axial strips 13 which contact the outer diameter of the tool shank 19 of the smaller insert system and conform to the curvature of the receptacle bore. The rotational driving jaws 28 accordingly assist the axial guiding of the small insert system. The guide length of the two insert systems is predetermined by the length of the receptacle bore 12 and is limited by the maximum shank length of the small insert system which is already commercially available (SDS-plus). The radial deflection of the rotational driving jaws 28 enables alternate use of the two insert systems. No parts need be exchanged or manually operated for this purpose. When the smaller insert system is introduced, the rotational driving jaws 28 cannot be displaced radially outward because the axial strips 13 have vertical end sides 13*a* and because the height of the axial strips 13 is not greater than the bevel 43 at the end of the small grooved shank 19. This ensures that the transmission of torque is taken over by the axial strips 13 when the small insert system is used. The rotational driving jaws 28 are held in their inner position by spring force, wherein it is ensured when unlocking by means of rotating the actuating sleeve 23 in the rotating direction that the locking of the rotational driving jaws 28 cannot be released during operation, e.g., in case of edge contact of the tool holder 10. In the embodiment example according to FIG. 8*a*, the resetting movement of the rotational driving jaws 28 is compelled by the sheet-metal ring 40 with the spring tongues 41 and by the spring rings 40, and torque transmission is accordingly ensured when the small insert system is used subsequently. A two-fold elastic sealing lip which tightly surrounds the respective grooved shank 18 and 19 is provided at the sealing lip ring 24 for sealing both insert systems to prevent the penetration of dirt, moisture and the like into the receptacle bore 12. The rotating movement of the control ring 27 is limited by a stop 44 in the region of the opening 38 in the receptacle spindle 11 in order to protect switching between the two insert systems. The control ring 27 is driven or carried along by the actuating sleeve 23 in a positive engagement by means of projections 45 or by pressing or gluing. Alternatively, the switching is achieved by axial displacement of the actuating sleeve 23 which results in the advantage that the actuating sleeve 23 can rotate freely relative to the receptacle spindle 11 when making contact with walls. This signifies increased safety for the operator of the machine because the machine will accordingly not receive any kick-back torque and will not release the locking.

What is claimed is:

1. Tool holder for tools inserted into machines for an operation selected from the group consisting of drilling operation, percussion operation and both, having an axial receptacle bore (20) and means for the rotational driving and axial locking of a tool shank which can be inserted into a tool receptacle of the respective machine, wherein a plurality of axial strips (13) which project inward are provided for the rotational driving and at least one radially lockable locking body (14) is provided at the tool holder (10) for locking, a plurality of axial grooves (16) are arranged at the circumference of the receptacle bore (12), and in that the axial strips (13) which are located opposite from one another and project inward are guided radially in the tool receptacle (10), such that they can be released outward in a springing manner, to enable optional insertion of a tool shank (19) with longitudinal grooves (10) which are located opposite one another and which have a smaller outer diameter, and of a tool shank (18) having the same core diameter but with outwardly projecting longitudinal ridges (17) with a greater outer diameter, wherein, for the purpose of rotational driving, the axial strips (13) cooperate with the corresponding longitudinal grooves (20) and the axial grooves (16) cooperate with the corresponding longitudinal ridges (17) of the respective inserted grooved shank (18, 19), the axial strips (13) project inward at two radially movable rotational driving jaws (28) located opposite from one another, wherein the rotational driving jaws (28) are held by spring pressure in a defined position radially inward against a stop (34) between the rotational driving jaws (28) and the tool receptacle spindle (11) of the tool holder (10).

2. Tool holder according to claim 1, wherein at least one spring ring (30) rests at the outer circumference of the receptacle spindle (11) on the two rotational driving jaws (28) and presses the latter radially inward against their stop (34) which is preferably formed by an outer widening at the rotational driving jaws (28).

3. Tool holder according to claim 1, wherein the inner surface of the rotational driving jaws (28) has the curvature of the receptacle bore (12), and in that the axial strips (13) of the rotational driving jaws (28) have, in the front, an end face (13*a*) which extends at a right angle to the axis of the tool holder (10).

4. Tool holder for tools inserted into machines for an operation selected from the group consisting of drilling operation, percussion operation and both having an axial receptacle bore (20) and means for the rotational driving and axial locking of a tool shank which can be inserted into a tool receptacle of the respective machine, wherein a plurality of axial strips (13) which project inward are provided for the rotational driving and at least one radially lockable locking body (14) is provided at the tool holder (10) for locking, a plurality of axial grooves (16) are arranged at the circumference of the receptacle bore (12), and in that the axial strips (13) which are located opposite from one another and project inward are guided radially in the tool receptacle (10), such that they can be released outward in a springing manner, to enable optional insertion of a tool shank (19) with longitudinal grooves (10) which are located opposite one another and which have a smaller outer diameter, and of a tool shank (18) having the same core diameter but with outwardly projecting longitudinal ridges (17) with a greater outer diameter, wherein, for the purpose of rotational driving, the axial strips (13) cooperate with the corresponding longitudinal grooves (20) and the axial grooves (16) cooperate with the corresponding longitudinal ridges (17) of the respective inserted grooved shank (18, 19), each of the rotational driving jaws (28) has, at its front end, a bevel (35) which is directed inward conically, the rotational driving jaws (28) being displaceable radially outward over the bevel (35) by the longitudinal ridges (17) of a tool shank (18) with the larger outer diameter.

5. Tool holder according to claim 4, wherein each of the rotational driving jaws (28) has, at its rear end, a rounded portion (36) which extends outward enabling a slight radial swiveling of the rotational driving jaws (28) prior to a radial displacement of the rotational driving jaws.

6. Tool holder for tools inserted into machines for an operation selected from the group consisting of drilling operation, percussion operation and both, having an axial receptacle bore (20) and means for the rotational driving and axial locking of a tool shank which can be inserted into a tool receptacle of the respective machine, wherein a plurality of axial strips (13) which project inward are provided for the rotational driving and at least one radially lockable locking body (14) is provided at the tool holder (10) for locking, a plurality of axial grooves (16) are arranged at the circumference of the receptacle bore (12), and in that the axial strips (13) which are located opposite from one another and project inward are guided radially in the tool receptacle (10), such that they can be released outward in a springing manner, to enable optional insertion of a tool shank (19) with longitudinal grooves (10) which are located opposite one another and which have a smaller outer diameter and of a tool shank (18) having the same core diameter, but with outwardly projecting longitudinal ridges (17) with a greater outer diameter, wherein, for the purpose of rotational driving, the axial strips (13) cooperate with the corresponding longitudinal grooves (20) and the axial grooves (16) cooperate with the corresponding longitudinal ridges (17) of the respective inserted grooved shank (18, 19).

7. Tool holder according to claim 6, characterized in that the tool receptacle (11) has a continuous axial receptacle bore (12) of identical diameter for guiding tool shanks (18, 19) with different outer diameters, wherein the axial grooves (16) provided at the circumference of the receptacle bore (12) for rotational driving terminate at a front widened portion (12*a*), and in that the axial strips which can be released radially outward are arranged in the region of these axial grooves (16).

8. Tool holder for tools inserted into machines for an operation selected from the group consisting of drilling operation, percussion operation and both having an axial receptacle bore (20) and means for the rotational driving and axial locking of a tool shank which can be inserted into a tool receptacle of the respective machine, wherein a plurality of axial strips (13) which project inward are provided for the rotational driving and at least one radially lockable locking body (14) is provided at the tool holder (10) for locking, a plurality of axial grooves (16) are arranged at the circumference of the receptacle bore (12), and in that the axial strips (13) which are located opposite from one another and project inward are guided radially in the tool receptacle (10), such that they can be released outward in a springing manner, to enable optional insertion of a tool shank (19) with longitudinal grooves (10) which are located opposite one another and which have a smaller outer diameter, and of a tool shank (18) having the same core diameter but with outwardly projecting longitudinal ridges (17) with a greater outer diameter, wherein, for the purpose of rotational driving, the axial strips (13) cooperate with the corresponding longitudinal grooves (20) and the axial grooves (16) cooperate with the corresponding longitudinal ridges (17) of the respective inserted grooved shank (18, 19), at least one locking body (14, 15) is provided at an axial distance from the other respective locking body (14, 15) for axial locking of the two different tool shanks (18, 19), wherein the locking bodies (14, 15) can be radially unlocked jointly by axial displacement of an outer actuating sleeve (23).

9. Tool holder according to claim 8, wherein the two locking bodies (14, 15) which are offset axially relative to one another are rotated relative to one another by 180° and are fixed radially, respectively, by a locking ring (25, 26) which is received in the actuating sleeve (23), these locking rings (25, 26) being displaceable against spring force by the actuating sleeve (23).

10. Tool holder according to claim 9, wherein a ring (40) which has spring tongues (41) and is fastened in the actuating sleeve (23) is arranged above the rotational driving jaws (28) and cooperates with an inclination (42) at the outer side of the rotational driving jaws (28) in such a way that it releases the radial locking of the rotational driving jaws (28) by means of an axial displacement of the actuating sleeve (23) and presses the rotational driving jaws (28) back into the locking position when the actuating sleeve is restored by spring force.

11. Tool holder according to claim 9, wherein the actuating sleeve (23) is displaceable axially against the spring force of a pressure spring (32) which is inserted between the actuating sleeve (23) and a cover sleeve (31) arranged behind the latter, wherein the cover sleeve (31) surrounds additional locking bodies (53) radially with a locking ring (55), wherein the locking bodies (55) bring about a positive engagement between the receptacle spindle (11) of the tool holder (10) on the one hand and a drill spindle (50) of the machine on the other hand, and in that the cover sleeve (31) is displaceable axially relative to the machine against the force of the pressure spring (32) for unlocking these locking bodies (53).

* * * * *